US012561707B1

(12) United States Patent
Palenik et al.

(10) Patent No.: US 12,561,707 B1
(45) Date of Patent: Feb. 24, 2026

(54) SYSTEMS AND METHODS FOR SPACE OPTIMIZATION IN A RETAIL ENVIRONMENT

(71) Applicant: WALGREEN CO., Deerfield, IL (US)

(72) Inventors: Mark Christopher Palenik, Washington, DC (US); Ajumobi O. Udechukwu, Lake Forest, IL (US)

(73) Assignee: WALGREEN CO., Deerfield, IL (US)

( * ) Notice: Subject to any disclaimer, the term of this patent is extended or adjusted under 35 U.S.C. 154(b) by 202 days.

(21) Appl. No.: 18/197,454

(22) Filed: May 15, 2023

(51) Int. Cl.
    *G06Q 30/0202* (2023.01)
(52) U.S. Cl.
    CPC ................................ *G06Q 30/0202* (2013.01)
(58) Field of Classification Search
    CPC ............. G06Q 10/087; G06Q 30/0639; G06Q 10/0631; G06Q 10/06315; G06Q 30/0202
    See application file for complete search history.

(56) References Cited

U.S. PATENT DOCUMENTS

| | | | | |
|---|---|---|---|---|
| 9,524,482 | B2 * | 12/2016 | Yopp ..................... | G06Q 10/067 |
| 10,460,269 | B1 * | 10/2019 | Hamburger ........ | G06Q 30/0201 |
| 10,817,818 | B1 * | 10/2020 | Hamburger ........ | G06Q 30/0201 |
| 11,443,276 | B2 * | 9/2022 | Brooks .............. | G06K 7/10386 |
| 11,823,256 | B2 * | 11/2023 | Wiedmeyer ........ | G06Q 30/0643 |
| 11,854,023 | B2 * | 12/2023 | Thirunavukkarasu ...................... | |
| | | | | G06Q 30/0202 |
| 2001/0047293 | A1 * | 11/2001 | Waller ................. | G06Q 20/203 |
| | | | | 705/28 |

| | | | | |
|---|---|---|---|---|
| 2011/0276364 | A1 * | 11/2011 | Bergstrom ............. | G06Q 10/04 |
| | | | | 705/7.29 |
| 2013/0006790 | A1 * | 1/2013 | Raskin ................... | G06Q 10/04 |
| | | | | 705/26.1 |
| 2015/0248630 | A1 * | 9/2015 | Ramanan ............... | G06Q 30/02 |
| | | | | 705/7.25 |
| 2016/0019717 | A1 * | 1/2016 | Yopp ....................... | G06T 19/20 |
| | | | | 345/633 |

(Continued)

OTHER PUBLICATIONS

Pantano, Elonora et al., Enhancing store layout design with agent-based simulations of consumer's density Expert Systems with Applications, vol. 182, 2021 (Year: 2021).*

(Continued)

*Primary Examiner* — Scott L Jarrett
(74) *Attorney, Agent, or Firm* — MARSHALL, GERSTEIN & BORUN LLP

(57)          ABSTRACT

Systems and methods for space optimization of a retail environment are provided. Example techniques may include calculating demand values associated with each of a plurality of departments that exist in the retail environment based on departmental data associated with each of the plurality of departments, the retail environment having a known amount of space; for each possible ordered pair of departments determining a halo demand value based on a relationship between a first demand value, associated with a first department of a pair, and an existence of a second department of the pair in the retail environment; and generating an optimized space output corresponding to a proportion of the retail environment allotted to each of the plurality of departments based on respective demand values for each of the plurality of departments and the halo demand values associated with each possible ordered pair of departments of the plurality of departments.

19 Claims, 5 Drawing Sheets

(56)    References Cited

U.S. PATENT DOCUMENTS

| | | | |
|---|---|---|---|
| 2019/0236528 A1* | 8/2019 | Brooks | ........... G06Q 10/06315 |
| 2023/0245050 A1* | 8/2023 | Singhal | ............... G06Q 10/087 |
| | | | 705/28 |
| 2024/0037496 A1* | 2/2024 | Thirunavukkarasu | ...................... |
| | | | G06Q 10/087 |

OTHER PUBLICATIONS

Oracle Retail AI Foundation Cloud Services Assortment and Space Optimization—User's Guide Oracle, Aug. 2022 (Year: 2022).*

Scorpion Retail Floor Planner Scorpionplanogram.com, Jun. 2021, Retrieved from Archive.org May 7, 2025 (Year: 2021).*

Gul, Evren et al., Retail Store Layout Optimization for Maximum Product Visibility Cornell University, May 19, 2021 (Year: 2021).*

Visual Merchandising—Chapter 4: Retail Store Design and Layout Retreived from http://marketmanage.wordpress.com/wp-content/uploads/2012/03/vm-ch4-retail-store-design-and-layout.pdf (Year: 2012).*

Corstjens, Maroel et al., A Model for Optimizing Retail Space Allocations Management Scice, vol. 27, No., 7, Jul. 1981 (Year: 1981).*

Pinto, Fabio et al., Combining regression models and metaheuristics to optimize space allocation in the retail industry Intelligent Data Analysis, vol. 19, 2015 (Year: 2015).*

\* cited by examiner

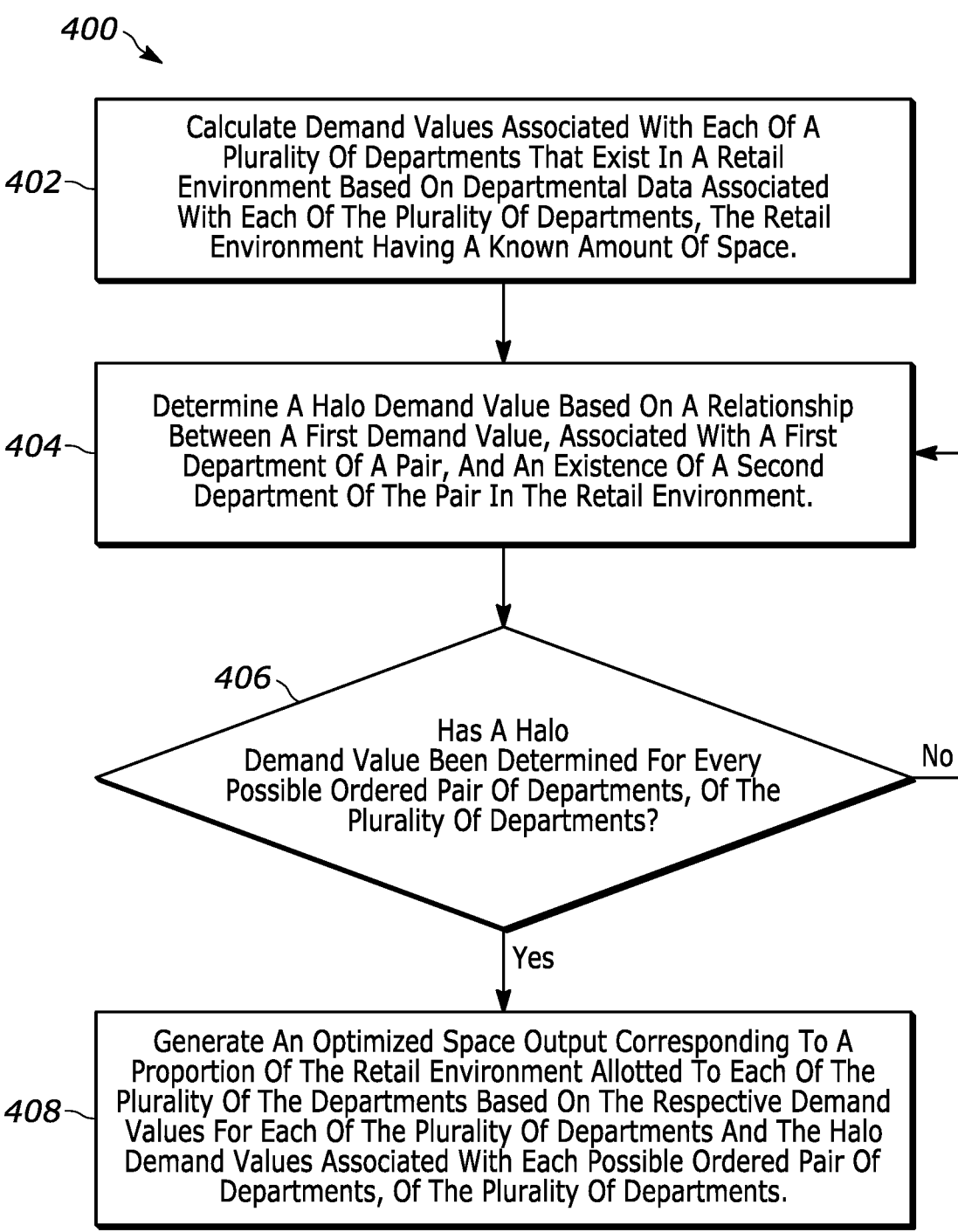

400

402 — Calculate Demand Values Associated With Each Of A Plurality Of Departments That Exist In A Retail Environment Based On Departmental Data Associated With Each Of The Plurality Of Departments, The Retail Environment Having A Known Amount Of Space.

404 — Determine A Halo Demand Value Based On A Relationship Between A First Demand Value, Associated With A First Department Of A Pair, And An Existence Of A Second Department Of The Pair In The Retail Environment.

406 — Has A Halo Demand Value Been Determined For Every Possible Ordered Pair Of Departments, Of The Plurality Of Departments?

No

Yes

408 — Generate An Optimized Space Output Corresponding To A Proportion Of The Retail Environment Allotted To Each Of The Plurality Of The Departments Based On The Respective Demand Values For Each Of The Plurality Of Departments And The Halo Demand Values Associated With Each Possible Ordered Pair Of Departments, Of The Plurality Of Departments.

FIG. 4

SYSTEMS AND METHODS FOR SPACE OPTIMIZATION IN A RETAIL ENVIRONMENT

FIELD OF THE INVENTION

The present disclosure generally relates to technologies associated with space optimization, and more particularly, to technologies for space optimization in a retail environment.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Presently, determining which departments should occupy space within a retail environment (e.g., stores, kiosks, physical and/or virtual spaces meant for the purchase of goods) may rely upon an individual department's demand (e.g., units sold, sales dollars, gross profit). Departments with the highest demand may be chosen to occupy space in an effort to maximize the possible earning of the retail environment. Given that the retail environment has a fixed amount of space for departments to occupy, allowing one department to occupy space within a retail environment over another department may influence the total demand the retail environment is able to achieve (i.e., potential demand). Furthermore, the amount of space allocated to one department over another (i.e., the size of one department being greater than another) may impact the potential demand of the retail environment as well.

Conventional techniques may address this issue by calculating a department's demand and comparing it to the demand of other departments and determining the greater of the demands. For example, a grocery store may have a produce department and a pet care department. The produce department may have a much greater demand than the pet care department, as determined from historical sales data. Those who manage the grocery store, in an effort to maximize demand, may increase the size of the produce department, possibly removing the pet care department entirely. However, conventional techniques do not consider the customer who needs both vegetables for their dinner and to restock on cat food. Consequently, the customer may choose to patronize a different grocery store they know has both a produce and a pet care department, thereby decreasing the potential demand of the produce department of the original grocery store. In this example, a department's potential demand may not only be influenced by size, as relied upon by conventional techniques.

Therefore, in general, conventional techniques may be insufficient for determining which departments should occupy space within a retail environment, and how much space each department should be allotted. Conventional techniques may also include additional ineffectiveness, insufficiencies, encumbrances, and/or other drawbacks.

SUMMARY

Generally, the present embodiments relate to, inter alia, systems and methods for space optimization in a retail environment (e.g., stores, kiosks, physical and/or virtual spaces meant for the purchase of goods from an enterprise)

to generate a recommended amount of space for each department within the retail environment to be allotted. In this manner, the systems and methods of the present disclosure may enable an enterprise of the retail environment to maximize potential demand (e.g., units sold, sales dollars, gross profit) of the retail environment as a whole.

In particular, the techniques of the present disclosure may consider factors related to an effect a second department has on a first department's demand. Such an effect, or, "halo" effect, may be quantifiable and thus influence determinations of space allocation in a retail environment beyond what conventional techniques are able to determine when considering a department's demand as independent of each other department's demand. Additionally, the present disclosure may consider factors related to a cumulative halo effect the first department's demand experiences from a plurality of departments, including the second department, and a plurality of cumulative halo effects on departments' demands corresponding to each department of the plurality of departments. Moreover, the techniques of the present disclosure may incorporate pragmatic limitations on the previously discussed techniques for the systems and methods to generate meaningful and/or actionable output comprehendible by managers of the retail environment. The techniques may accordingly cause the potential demand of the retail environment to be maximized.

One exemplary embodiment of the present disclosure may be a computer-implemented method for space optimization in a retail environment. The computer-implemented method may be implemented via one or more local or remote processors, servers, transceivers, memory units, mobile devices, and/or other electronic or electrical components, which may be in wired or wireless communication with one another. In one instance, the method may include: (1) calculating, by one or more processors, demand values associated with each of a plurality of departments that exist in the retail environment based on departmental data associated with each of the plurality of departments, the retail environment having a known amount of space; (2) for each possible ordered pair of departments, of the plurality of departments, determining, by one or more processors, a halo demand value based on a relationship between a first demand value, associated with a first department of a pair, and an existence of a second department of the pair in the retail environment; and (3) generating, by one or more processors, an optimized space output corresponding to a proportion of the retail environment allotted to each of the plurality of the departments based on the respective demand values for each of the plurality of departments and the halo demand values associated with each possible ordered pair of departments of the plurality of departments. The method may include additional, less, or alternate actions, including those discussed elsewhere herein.

Another exemplary embodiment of the present disclosure is a computer system for space optimization in a retail environment. The computer system may be implemented via one or more local or remote processors, servers, sensors, transceivers, memory units, mobile devices, and/or other electronic or electrical components, which may be in wired or wireless communication with one another. In one instance, the system may include: one or more processors and a non-transitory computer readable memory coupled to the one or more processors. The memory may store instructions thereon that, when executed by the one or more processors, may cause the one or more processors to: (1) calculate, by one or more processors, demand values associated with each of a plurality of departments that exist in the retail environment based on departmental data associated with each of the plurality of departments, the retail environment having a known amount of space; (2) for each possible ordered pair of departments, of the plurality of departments, determine, by the one or more processors, a halo demand value based on a relationship between a first demand value, associated with a first department of a pair, and an existence of a second department of the pair in the retail environment; and (3) generate, by the one or more processors, an optimized space output corresponding to a proportion of the retail environment allotted to each of the plurality of the departments based on the respective demand values for each of the plurality of departments and the halo demand values associated with each possible ordered pair of departments of the plurality of departments. The system may include additional, less, or alternate functionality, including that discussed elsewhere herein.

Another exemplary embodiment of the present disclosure may be a tangible machine-readable medium which may include instructions for space optimization of a retail environment. The instructions of the tangible machine-readable medium thereon may be implemented via one or more local or remote processors, servers, sensors, transceivers, memory units, mobile devices, and/or other electronic or electrical components, which may be in wired or wireless communication with one another. In one instance, the instructions of the tangible machine-readable medium, when executed, may cause a machine to at least: (1) calculating, by one or more processors, demand values associated with each of a plurality of departments that exist in the retail environment based on departmental data associated with each of the plurality of departments, the retail environment having a known amount of space; (2) for each possible ordered pair of departments, of the plurality of departments, determining, by the one or more processors, a halo demand value based on a relationship between a first demand value, associated with a first department of a pair, and an existence of a second department of the pair in the retail environment; and (3) generating, by the one or more processors, an optimized space output corresponding to a proportion of the retail environment allotted to each of the plurality of the departments based on the respective demand values for each of the plurality of departments and the halo demand values associated with each possible ordered pair of departments of the plurality of departments. The instructions may direct additional, less, or alternative functionality, including that discussed elsewhere herein.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

In accordance with the above, and with the disclosure herein, the present disclosure includes improvements in computer functionality or in improvements to other technologies at least because the present disclosure describes that, e.g., space optimization in a retail environment, may be improved or enhanced with the disclosed systems and methods that consider unconventional factors to determine the optimal space allocated to departments in a retail environment. That is, the present disclosure describes improvements in the functioning of a computer itself or "any other technology or technical field" (e.g., space optimization, demand prediction of retail environments) because the disclosed systems and methods provide (1) consideration of how the existence of a department, or plurality of departments, influences the demand of a different department, and (2) generation of an optimized space output in a manner that is unachievable using conventional systems and methods. This improves over the prior art at least because such conventional techniques lack the ability to determine the optimal size of a department within a retail environment when more than one department exists.

Still further, the present disclosure includes specific features other than what is well-understood, routine, conventional activity in the field, or adds unconventional steps that demonstrate, in various embodiments, particular useful applications, e.g., calculating demand values associated with each of a plurality of departments that exist in a retail environment; for each possible ordered pair of departments, of the plurality of departments, determining, by the one or more processors, a halo demand value based on a relationship between a first demand value, associated with a first department of the pair, and an existence of a second department of the pair in the retail environment; and generating, by the one or more processors, an optimized space output corresponding to a proportion of the retail environment allotted to each of the plurality of the departments based on the respective demand values for each of the plurality of departments and the halo demand values associated with each possible pair of departments of the plurality of departments.

BRIEF DESCRIPTION OF THE DRAWINGS

The figures described below depict various aspects of the system and methods disclosed herein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 4 depicts a flow diagram of an exemplary computer-implemented method for space optimization of a retail environment, according to one embodiment.

Figure 1:
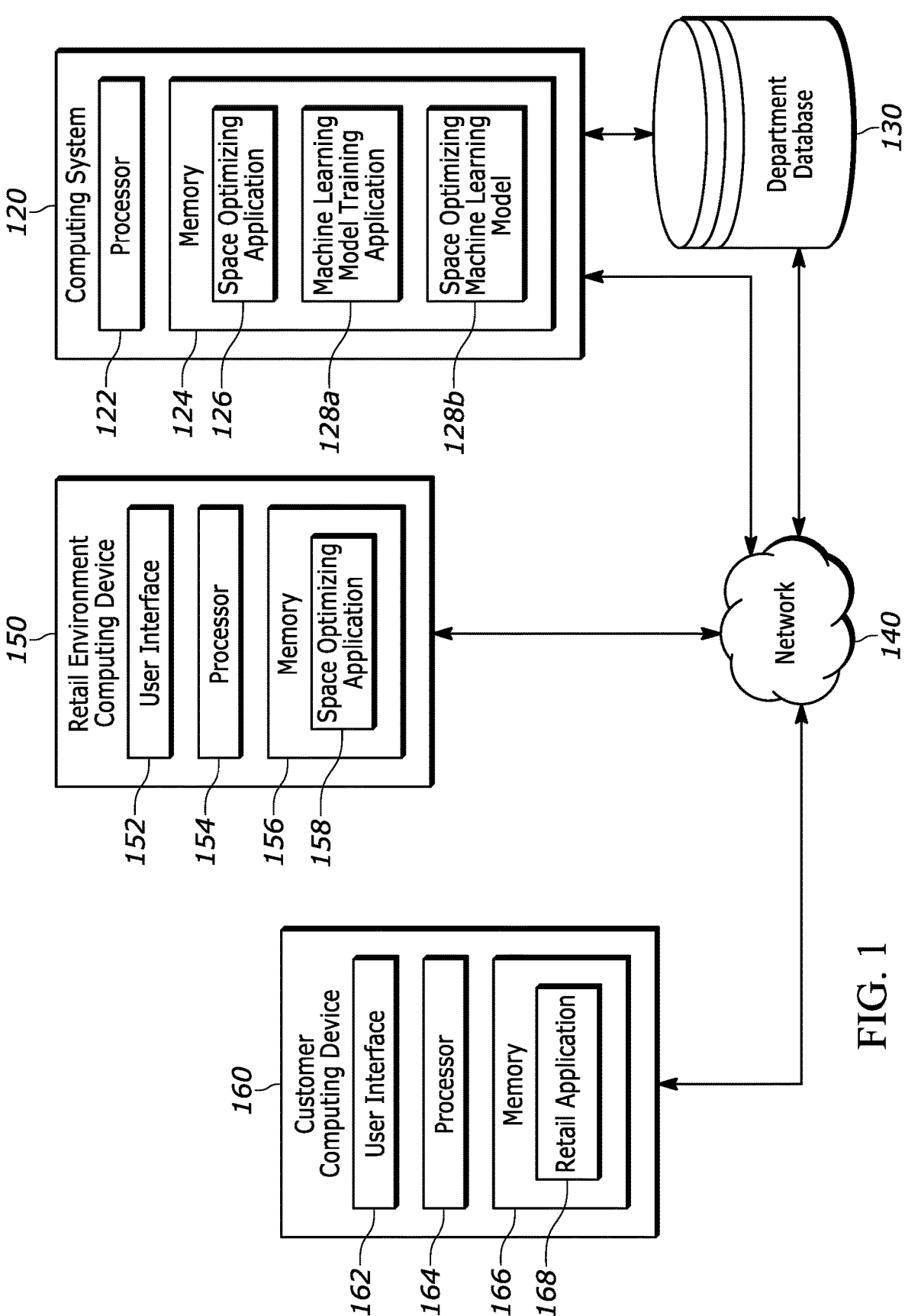
FIG. 1 depicts an exemplary computing system for space optimization of a retail environment, according to one embodiment.

While the systems and methods disclosed herein is susceptible of being embodied in many different forms, it is shown in the drawings and will be described herein in detail specific exemplary embodiments thereof, with the understanding that the present disclosure is to be considered as an exemplification of the principles of the systems and methods disclosed herein and is not intended to limit the systems and methods disclosed herein to the specific embodiments illustrated. In this respect, before explaining at least one embodiment consistent with the present systems and methods disclosed herein in detail, it is to be understood that the systems and methods disclosed herein is not limited in its application to the details of construction and to the arrangements of components set forth above and below, illustrated in the drawings, or as described in the examples.

Methods and apparatuses consistent with the systems and methods disclosed herein are capable of other embodiments and of being practiced and carried out in various ways. Also, it is to be understood that the phraseology and terminology employed herein, as well as the abstract included below, are for the purposes of description and should not be regarded as limiting.

DETAILED DESCRIPTION

Overview

The techniques described herein may enable those of ordinary skill in the art to optimize sizes of departments within a retail environment to maximize potential demand, by considering the effect, or, "halo" effect, departments have on each other's demand. By doing so, the demand of a single department may remain predictable as a function of size, but the demand may more accurately represent the single department's demand when existing in a retail environment with other departments. Accordingly, an accurate optimal size for the single department when among other departments may be generated using the techniques provided herein.

However, not every department's demand or halo effect may need to be considered to generate an optimal size for the single department. As many, or all, departments in a retail environment may exert a halo effect on many or all of the departments, the quantitative process may become overwhelming for a system or method. In some examples, it may then be advantageous to only consider halo effects between two departments when the demands of each department are correlated to each other. For example, before determining halo effects, a type of relationship (e.g., correlated, uncorrelated) between two departments may be established to improve operating speed and/or efficiency by only allowing halo effects between departments with correlated demands to be considered for space optimization. This relationship may be characterized as whether departments "lift" each other's demands and be based on probabilities of a customer's purchase behavior. Accordingly, when two departments do not lift the other's demands to a determined degree, then the halo effect may be disregarded. The extent to which the relevant halo effect influences a department's demand may then be characterized by a halo demand, which may include the demand of the department being influenced modified by the halo effect another department exerts. Generating an optimized space output may then consider both demand and halo demand to identify a most likely size of a department to yield a maximum potential demand of the department, of the retail environment, and/or of a pre-established list of department sizes.

As utilized herein, the term "retail environment" generally refers to one or more physical storefronts or physical storefront locations where an enterprise engages with consumers. Examples of physical storefronts of the enterprise may include bricks-and-mortar stores, retail operations hosted within other buildings (such as hospitals, university buildings, shopping malls, airports, etc.), pop-up stores or locations, and the like. Additionally, or alternatively, the enterprise may include one or more electronic storefronts or electronic storefront locations, such as retail applications for personal electronic devices (PEDs), and/or virtual retail environments, as discussed in greater detail elsewhere in this disclosure. A retail environment may further be considered as a cluster of departments, a cluster of storefronts, or any categorizations of space (e.g., sub-departments, individual retail products, brands of retail products) where an enterprise engages with consumers. The term "department," as utilized herein, generally refers to a section of a retail environment wherein the product(s) include a commonality (e.g., proximity, product type, manufacturer, intended use). The terms "customer," "patron," and/or "consumer," as utilized herein, generally refer to individuals in the retail environment or observing a virtual retail environment who may possibly patronize the retail environment/virtual retail environment. The term "demand," as utilized herein, generally refers to the economic demand exerted by consumers and may be measured by departmental data, such as the number of product units sold, sales dollars, gross profit, comprehensive profit, or a combination of one or more. Accordingly, for techniques provided herein, the demand of a department (without considering halo effects from other departments existing in the retail environment) may be represented as a "demand value," and the determined demand of the department (with considering halo effect from another department existing in the retail environment) may be represented as a "halo demand value."

Example System

Referring now to the drawings, FIG. 1 depicts an exemplary computer system 100 for space optimization in a retail environment, according to one embodiment. The high-level architecture illustrated in FIG. 1 may include both hardware and software applications, as well as various data communications channels for communicating data between the various hardware and software components, as is described below.

The computer system 100 of FIG. 1 may include a computing system 120, which is described in greater detail below with respect to FIG. 5, as well as, in some cases, one or more of a retail environment computing device 150 or customer computing device 160 (which may include, e.g., smart phones, smart watches, tablets, laptops, virtual reality headsets, smart or augmented reality glasses, wearables, etc.). The computing system 120, retail environment computing device(s) 150 and/or customer computing device(s) 160 may be configured to communicate with one another via a wired or wireless computer network 140.

Although one computing system 120, one retail environment computing device 150, one customer computing device 160, and one network 140 are shown in FIG. 1, any number of such computing systems 120, computing devices (e.g., 150, 160), and/or networks 140 may be included in various embodiments. To facilitate such communications the computing system 120 and computing device(s) (e.g., 150, 160) may each respectively include a wireless transceiver to receive and transmit wireless communications.

In some embodiments the computing system 120 may comprise one or more servers, which may comprise multiple, redundant, or replicated servers as part of a server farm. In still further aspects, such server(s) may be implemented as cloud-based servers, such as a cloud-based computing platform. For example, such server(s) may be any one or more cloud-based platform(s) such as MICROSOFT AZURE, AMAZON AWS, or the like. Such server(s) may include one or more processor(s) 122 (e.g., CPUs) as well as one or more computer memories 124.

The one or more memories 124 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The one or more memories 124 may store an operating system (OS) (e.g., iOS, Microsoft Windows, Linux, UNIX, etc.) capable of facilitating the functionalities, apps, methods, or other software as discussed herein. The one or more memories 124 may also store a space optimizing application 126, a space optimizing machine learning model 128b, and/or a machine learning model training application 128a.

Additionally, or alternatively, the memorie(s) 124 may store departmental data from various sources, such as historical records including demand data of departments and/or retail environments and data determined, calculated, and/or generated by the computing system 120. The departmental data may also be stored in a department database 130, which may be accessible or otherwise communicatively coupled to the computing system 120 and/or the network 140. In some embodiments, the departmental data or other data from various sources may be stored on one or more blockchains or distributed ledgers.

When executed by the one or more processors 122, the space optimizing application 126 of the computing system 120 may generate an optimized space output corresponding to a proportion of a retail environment allotted to each of the departments in the retail environment. The space optimizing application 126 may generate the optimized space output based on calculations and/or determinations of actual and/or predicted values derived from departmental data indicative of a first department's demand value and/or influence over other department's demand values. For example, given that each department has a relationship to each other department, the space optimizing application 126 may iteratively group the plurality of departments within a retail environment into ordered pairs and may determine a halo demand value for each possible ordered pair of departments based on a relationship between a first demand value (associated with a first department of the ordered pair) and an existence of a second department of the ordered pair. This relationship may be understood as the halo effect the existence of the second department has on the first demand value of the first department of the ordered pair. When a halo demand value for each possible ordered pair has been determined, the space optimizing application 126 may then generate the optimized space outputs.

In some exemplary embodiments, the space optimizing application 126 of the computing system 120 may determine, by one or more processors 122, a lift value based on the departmental data of the first and second departments, to define a relationship between the departments as correlated or uncorrelated. That is, the space optimizing application 126 may determine that departments are correlated when the lift value is compared to a threshold range of values, e.g., outside a threshold range, and uncorrelated when compared to a threshold range of values, e.g., within the threshold range. When the lift value is outside a threshold range, the halo effect a second department's existence has on the first demand value of a first department may cause the halo demand value to be different from the first demand value. Accordingly, when the lift value is outside a threshold range, the second halo demand value (corresponding to the halo effect the first department's existence has on a second demand value of the second department of the ordered pair) may be different than the second demand value. These exemplified relationships between demand values and halo demand values based on the lift value being outside a threshold range may allow the space optimizing application 126 to operate more efficiently by only considering relevant halo effects (e.g., halo effects between departments with correlated demand values) when optimizing department sizes and retail environment space to generate an optimized space output. Conversely, when lift values are within a threshold range, the halo demand value and first demand value of the first department may be the same due to the existence of the second department having a negligible effect on the department's demand value. The space optimizing application 126 may store the halo demand values, demand values, and lift values in the memorie(s) 124 and/or in the department database 130.

In some exemplary embodiments, the space optimizing application 126 may determine the lift value based on a probability a customer buys from both departments in relation to a probability a customer only buys from the first department or only buys from the second department. The space optimizing application 126 may define the probability a customer enters the retail environment and only buys from the first department as a first probability, the probability a customer enters the retail environment and only buys from the second department as a second probability, and the probability a customer enters the retail environment and buys from both the first department and the second department as a third probability. The space optimizing application 126 may determine the first, second, and third probabilities from departmental data indicative of, for example, sales data for respective departments, customer purchase habits, or other metrics to determine probability of an occurrence. Accordingly, the space optimizing application 126 may determine the lift value based on the first probability, second probability, and the third probability. The space optimizing application 126 may access, retrieve, or otherwise obtain the departmental data from the memorie(s) 124, the department database 130, and/or via the network 140. The computing system 120 may utilize techniques of determining lift as discussed with respect to FIG. 4 below.

In some exemplary embodiments, the space optimizing application 126 may calculate demand values for each department by determining a predicted demand value and an actual demand value. The space optimizing application 126 may fit a first plurality of variable parameters to departmental data captured over a first period of time in order to determine a predicted demand value, representing the demand value a department is predicted to make in a second period of time (subsequent to and/or including a first period of time). The space optimizing application 126 may calculate an actual demand value, representing the demand value the department actually makes during the second period of time, based on departmental data stored in the department database 130 corresponding to the second period of time.

The space optimizing application 126 may minimize a loss function which is the sum of the L2 regularization term, r, and the mean square error between the actual and predicted demand values when calculating a department's demand value to calculate a demand value which accurately represents the department's demand value as captured over a period of time (of the past, present, or future), in contrast to a single moment in time. The space optimizing application 126 may store the determined actual demand value and predicted demand value in the department database 130, and may redetermine these values when the predictive model loses accuracy. The computing system 120 may utilize techniques to determine actual and predicted demand values as discussed with respect to FIG. 4 below.

In some embodiments, the space optimizing application 126 may generate optimized space outputs by considering a cumulative halo demand value based on the determined halo demand values for each ordered pair of departments. The space optimizing application 126 may further impose limitations and/or transformations of the halo demand values (and thus the cumulative halo demand value) in order to mitigate issues of efficiency, a system's computing capacity, and/or limited departmental data. For example, the space optimizing application 126 may utilize an L2 regularization term as an adjustable parameter to cause the calculations to be cautious when considering a large halo effect in the halo demand values. A regularization term may be especially relevant when there is limited departmental data. Additionally, or alternatively, the space optimizing application 126 may limit the cumulative halo demand value by using another adjustable parameter to impose non-linearity and flatten the cumulative halo demand value when a certain limit is reached. Furthermore, the space optimizing application 126 may determine a cumulative halo demand value for each department to represent the cumulative halo effects of each other department's existence influencing the department's demand value. Accordingly, the space optimizing application 126 may limit and/or transform a plurality of cumulative halo demand values to use when generating the optimized space outputs. The space optimizing application 126 may utilize techniques for limiting and transforming halo demand values as discussed with respect to FIG. 4 below.

As discussed above, the one or more memories 124 may also store a machine learning (ML) model training application 128a and a space optimizing ML model 128b. In some examples, executing the space optimizing application 126 may include generating optimized space outputs, using the space optimizing ML model 128b, based on departmental data. The space optimizing ML model 128b may be executed on the computing system 120, while in other examples the space optimizing ML model 128b may be executed on another computing system (not illustrated), separate from the computing system 120. For instance, the computing system 120 may send departmental data to another computing system, where the trained space optimizing ML model 128b generates optimized space outputs and predictions based on the received departmental data, and the other computing system may send the predictions or generated optimized space outputs to the computing system 120. Moreover, in some examples, the ML model training application 128a may train the space optimizing ML model 128b on the computing system 120, while in other examples, the ML model training application 128a may train the space optimizing ML model 128b on a computing system separate from the computing system 120.

Whether the ML model training application 128a trains the space optimizing ML model 128b on the computing system 120 or elsewhere, the ML model training application 128a may train the space optimizing ML model 128b using training data corresponding to (1) historical departmental data indicative of a plurality of departmental data of a plurality of retail environments and (2) a plurality of respectively generated historical optimized space outputs data. For example, training data may include the departmental data (i.e., inputs) the space optimizing ML model 128b utilizes which correspond to optimized space outputs (i.e., outputs) generated by the space optimizing application 126. Accordingly, the trained space optimizing ML model 128b may then be applied to new departmental data, and/or newly selected departmental data, in order to generate, e.g., an optimized space output corresponding to the new departmental data.

In various aspects, the space optimizing ML model 128b may comprise a machine learning program or algorithm that may be trained by and/or employ a neural network, which may be a deep learning neural network, or a combined learning module or program that learns in one or more features or feature datasets in particular area(s) of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques.

In some embodiments, the artificial intelligence and/or machine learning based algorithms used to train the space optimizing ML model 128b may comprise a library or package executed on the computing system 120 (and/or other computing devices not shown in FIG. 1). For example, such libraries may include the TENSORFLOW based library, the PYTORCH library, and/or the SCIKIT-LEARN Python library.

Machine learning may involve identifying and recognizing patterns in existing data (such as training a model based upon historical departmental data utilized to generate optimized space outputs and the corresponding optimized space outputs) in order to facilitate making predictions or identification for subsequent data (such as using the machine learning model on new departmental data in order to determine a prediction of optimized space outputs and/or the predicted maximized demand value based on the predicted optimized space outputs).

Machine learning model(s) may be created and trained based upon example data (e.g., "training data") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based upon the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques.

In addition, memorie(s) 124 may also store additional machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For instance, in some examples, the computer-readable instructions stored on the memorie(s) 124 may include instructions for carrying out any of the steps of the method 400, which is described in greater detail elsewhere herein with respect to FIG. 4. It should be appreciated that one or more other applications may be stored on the memorie(s) 124 and executed by the processor(s) 122. It should be appreciated that given the state of advancements of mobile computing devices, all of the processes functions and steps described herein may be present together on a mobile computing device, such as the customer computing device 160.

As discussed above, the computer system 100 may also include a retail environment computing device 150. The retail environment computing device 150 may be accessed by users (e.g., an employee and/or management of the retail environment) when in the retail environment. Accordingly, the user may implement the space optimization techniques disclosed herein to the retail environment by having local access to a space optimizing application 158, the computing system 120, and/or the department database 130. The retail environment computing device 150 may be located in areas of the retail environment accessible and/or inaccessible to patrons. The retail environment computing device 150 may be connected to the network 140 via wired and/or wireless connection.

The retail environment computing device 150 may include, or may be configured to communicate with, a user interface 152, which may receive input from users and may provide audible or visible output to users. Furthermore, the retail environment computing device 150 may include one or more processors 154, one or more memories 156, and be communicatively coupled to the network 140. The user interface 152 may display aspects of the techniques disclosed herein for a manager, or other person at the retail environment, to obtain information and interact with the computing system 120 or the customer computing device 160. For example, the user interface 152 may display to an employee the current demand values of each department or show which departments have the greatest halo effect on a particular department. The user interface 152 may show an alert indicating the space optimizing application 158 has generated new optimized space outputs that are incongruent with the space departments currently occupy at the time of the alert. This would inform the user the departments may need to be reconfigured. In another example, the user interface 152 may display a questionnaire for patrons to complete. The patrons may indicate departmental data the space optimizing application 158 may subsequently use to generate optimized space outputs. The departmental data may be stored on the memorie(s) 156 and/or the department database 130. The questionnaire may gather departmental data indicating which departments the patron intended to patronize, which departments the patron actually patronized, if the patron would not have patroned the retail environment if any particular department was smaller, and/or why they chose to patron this retail environment. Gathered departmental data may be associated with the patron's receipt of purchased products, and/or lengths of time the patron spent in areas of the retail environment.

Similarly to memorie(s) 124, the memorie(s) 156 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memorie(s) 156 may store an operating system (OS) (e.g., iOS, Microsoft Windows, Linux, UNIX, etc.) capable of facilitating the functionalities, apps, methods, or other software as discussed herein. Memorie(s) 156 may also store a space optimizing application 158, which may contain identical and/or similar instructions to the space optimizing application 126 and cause the space optimizing application 158 to perform similar or identical functions. Additionally, or alternatively, the memorie(s) 156 may store instructions for displaying departmental data to the user interface 152, and/or instructions to gather departmental data from users (e.g., managers, patrons). Additionally, or alternatively, the memorie(s) 156 may store departmental data from various sources, such as historical records including demand value data of departments and/or retail environments.

The retail environment computing device 150 may interact with the customer computing device 160 via the network 140 by receiving and/or transmitting signals indicating, for example, departmental data and/or instructions to be executed. For example, the customer computing device 160 displaying a virtual retail environment may determine a change in user behavior, such as increased traffic to a particular department, and transmit the departmental data to the retail environment computing device 150. In this example, increased traffic may indicate increased interest in the department, inform an increase of the department's demand value, and the demand value be utilized by the space optimizing application 158 generating optimized space outputs for the retail environment. In another example, a department of the retail environment may have been allotted less space according to optimized space outputs, and consequently management of the retail environment may initiate a sale on specific products (e.g., products in the downsized department). Accordingly, the retail environment computing device 150 may transmit instructions to the customer computing device 160 to display via the user interface 162 information regarding the sale of products in the retail environment. In another example, the retail environment computing device 150 may also transmit instructions to the customer computing device 160 to prompt the user with questions which would gather departmental data. In an additional example, the retail environment computing device 150 may receive data from the customer computing device 160 indicating the location of the customer computing device 160, the location of the user, and/or the products purchased by the user. The retail environment computing device 150 may subsequently generate optimized space outputs based on, for example, the number of users within a given proximity to the retail environment and/or the purchase history of users within a given proximity to the retail environment.

The retail environment computing device 150 may also interact with the computing system 120 via the network 140 by receiving and/or transmitting signals indicating, for example, departmental data and/or instructions to be executed. For example, the computing system 120 may aggregate departmental data from a plurality of retail environment computing devices (not illustrated). The retail environment computing device 150 may subsequently retrieve/receive the departmental data and generate optimized space outputs based on this departmental data. The retail environment computing device 150 may also interact with the plurality of retail environment computing devices (not illustrated) directly via the network 140 to aggregate the departmental data. In another example, the retail environment computing device 150 may transmit answers indicated by patrons of the retail environment prompted by a questionnaire to the computing system 120.

As discussed above, the computer system 100 may further include a customer computing device 160. The customer computing device 160 may be a device exclusively used to execute a retail application 168, or may be a personal electronic device (PED) with the retail application 168 being one of a plurality of applications (apps) executed on the PED. In contrast to the retail environment computing device 150, the customer computing device 160 may be used by a patron (i.e., user) while not physically in the retail environment, but instead provide the user access to a virtual retail environment to be patronized from any physical location. The customer computing device 160 may include, or may be configured to communicate with, a user interface 162, which may receive input from users and may provide audible or visible output to users. For example, the user interface 162 may display the virtual retail environment and allow users to interact/manipulate the virtual environment in order to purchase products. The user interface 162 may also display signals received by the customer computing device 160 from the retail environment computing device 150 and/or computing system 120 via the network 140. For example, signals received by the customer computing device 160 from the retail environment computing device 150 may inform about departments that have been upsized, and consequentially have new products available in store, and cause the user interface 162 to display the information. In another example, the signal may cause the user interface 162 to display questions of a questionnaire intended to gather departmental data. The user may then interact with the user interface 162 to answer the questions.

The customer computing device 160 may further include one or more processors 164, one or more memories 166, and be communicatively coupled to the network 140. Similarly to memorie(s) 124 and memorie(s) 156, the memorie(s) 166 may include one or more forms of volatile and/or non-volatile, fixed and/or removable memory, such as read-only memory (ROM), electronic programmable read-only memory (EPROM), random access memory (RAM), erasable electronic programmable read-only memory (EE-PROM), and/or other hard drives, flash memory, MicroSD cards, and others. Memorie(s) 166 may store an operating system (OS) (e.g., iOS, Microsoft Windows, Linux, UNIX, etc.) capable of facilitating the functionalities, apps, methods, or other software as discussed herein. Memorie(s) 166 may also store a retail application 168 that may be executed by the one or more processors 164. Additionally, or alternatively, the memorie(s) 156 may store departmental data from various sources, such as historical records including demand value data of departments and/or retail environments.

Executing the retail application 168 may include displaying a virtual retail environment and/or electronic storefront to the user interface 162 for the customer to interact with in order to purchase products. The retail application 168 may calculate demand values for each department of the virtual retail environment and/or electronic storefront, determine halo demand values for each department of the virtual retail environment based on the department's demand values and halo effect caused by the existence of another department, and generate an optimized space output for the virtual retail environment based on demand values and halo demand values in a similar manner as discussed above with respect to the space optimizing applications 126 and 158. The retail application 168 may then reconfigure the virtual retail environment and/or electronic storefront displayed to the customer by changing the sizes of the departments of the virtual retail environment to correspond with the generated optimized space output. In these embodiments, although the virtual retail environment does not physically exist, the retail application 168 may determine the size of the virtual retail environment through other technical or physical constraints. For example, the processor(s) 164 and/or memorie(s) 166 of the customer computing device 160 may have limited capacities, and the retail application 168 may determine the size of the virtual retail environment based on these capacities (i.e., based on a relationship between the size of the virtual retail environment and the capacities of the processor(s) 164 and/or memorie(s) 166. For instance, when the retail environment is virtual, e.g., existing as an augmented reality or in a "meta-verse," the virtual space may be technically limited and finite due to the computing system 120 having a limited computing capacity. Additionally, or alternatively, the user interface 162 may have physical restrictions, such as the size of the user's screen on the customer computing device 160. In this instance, at any given time, the retail application 168 can only display as much of the electronic storefront and/or as many departments of the electronic storefront, as may fit on the screen of the user interface 162 at once. Additionally, limitations of the user's biology (e.g., vision quality) only permit a limited number of objects to be perceptible at a single time, and thus, a known amount of retail environment exists. Similarly, the customer computing device 160 may only display, via the user interface 162, departments/objects of a size perceptible to the user, according to known vision capabilities. This is relevant, for example, in aspects where the virtual retail environment exists within the metaverse. These attributes contribute to the system and methods herein being utilized when the retail environment is virtual and/or electronically represented in some way.

The customer computing device 160 may interact with the retail environment computing device 150 via the network 140 by receiving and/or transmitting signals indicating, for example, departmental data and/or instructions to be executed. For example, the customer computing device 160 may be able to determine the location of user and transmit the location to the retail environment computing device 150. The customer computing device 160 may determine the user's location by various means, such as from the user's shipping address given by the user to deliver products purchased in the virtual retail environment, or the customer computing device 160 may be a PED with global positioning system (GPS) capabilities. In another example, the customer computing device 160 may receive instructions to display, via the user interface 162, questions from a questionnaire for the user to answer by interacting with the user interface 162. The customer computing device 160 may store the answers to the questionnaire on memorie(s) 166 and transmit the stored answers to the retail environment computing device 150 and/or the computing system 120. In other examples, a customer computing device 160 may retrieve product information from the retail environment computing device 150 and/or computing system 120 such as products in and/or out of stock.

Figures 2A, 2B:
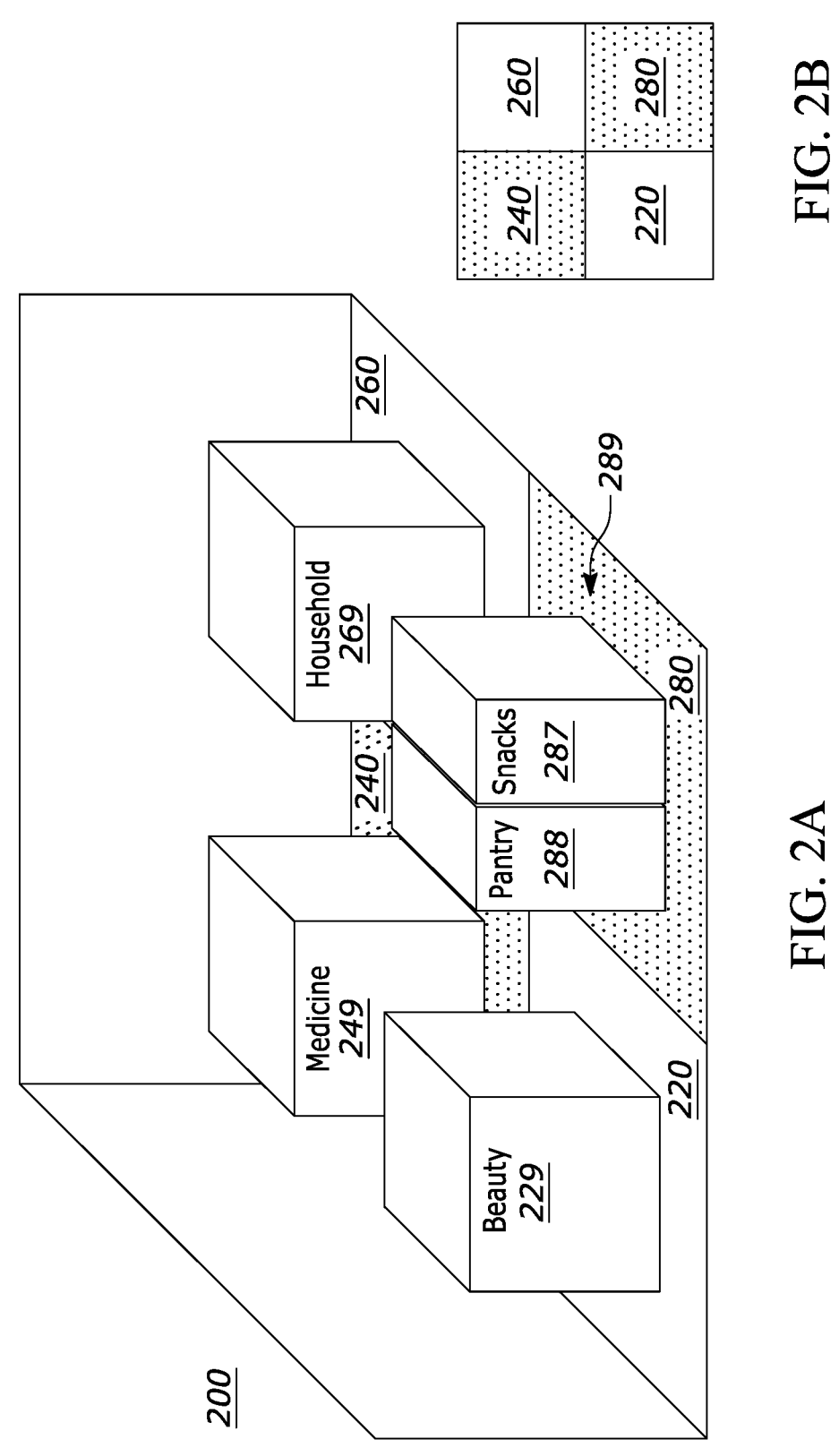
FIG. 2A depicts an exemplary retail environment prior to implementation of the techniques provided herein, according to one embodiment.
FIG. 2B depicts a plan view of the exemplary retail environment FIG. 2A prior to implementation of the techniques provided herein, wherein space allotted to individual departments is shown, according to one embodiment.

In various embodiments, the retail application 168, the space optimizing application 158, the space optimizing application 126, the ML model training application 128a, and/or the space optimizing ML model 128b may be stored on any memory of the computer system 100 (such as memories 124, 156, and/or 166) and executed by any one or more processors of the computer system 100 (such as processor(s) 122, processor(s) 154, and/or processor(s) 164). Furthermore, the techniques disclosed herein may be performed all on a single application, module, model, etc., and on a single device, system, network, etc., or partially performed on a plurality of applications, modules, or models and on a plurality of devices, systems, or networks.
Example Retail Environment FIG. 2A depicts an exemplary retail environment 200 before the techniques described herein have been implemented, in contrast to FIG. 3A which depicts the exemplary retail environment after which the techniques described herein have been implemented. Furthermore, FIG. 2B depicts a plan view of the exemplary retail environment of FIG. 2A and FIG. 3B depicts a plan view of the exemplary retail environment of FIG. 3A.

In general, the example retail environment 200 of FIG. 2A depicts four departments (a beauty department 220 for products such as skin care or hair care, a medicine department 240 for products such as over the counter medications or medical devices, a household department 260 for products such as cleaning supplies, laundry supplies or bathroom essentials, and a grocery department 280 for products such as pantry products or snack products), with each department including space for products to be displayed (i.e., product space). For example, the beauty department 220 may include beauty product space 229 where products may be displayed for patrons to survey and possibly purchase. The departments and product spaces of retail environment 200 are all equal size. However, this may not be the optimal size to maximize potential demand and gross profit of the retail environment 200. Therefore, space optimization techniques disclosed herein may be implemented to generate optimized space outputs. The retail environment 300 of FIG. 3A depicts the four departments of various sizes corresponding to optimized space outputs.

For example, the department database 130 may store departmental data regarding the beauty department 220, the medicine department 240, the household department 260, and the grocery department 280; data such as size of the department, net sales, products on the shelves, etc. Management of the retail environment 200 may then want to maximize the potential demand of the retail environment by optimizing the space and initiate a space optimizing application 126 of a computing system 120 to consider demand values of each department individually, and the demand values of each department when the other three departments exist. The space optimizing application 126 of the computing system 120 may subsequently retrieve relevant departmental data from the department database 130 and generate optimized space outputs corresponding to a proportion of the retail environment allotted to each of the four departments (e.g., 220, 240, 260, 280).

Figures 3A, 3B:
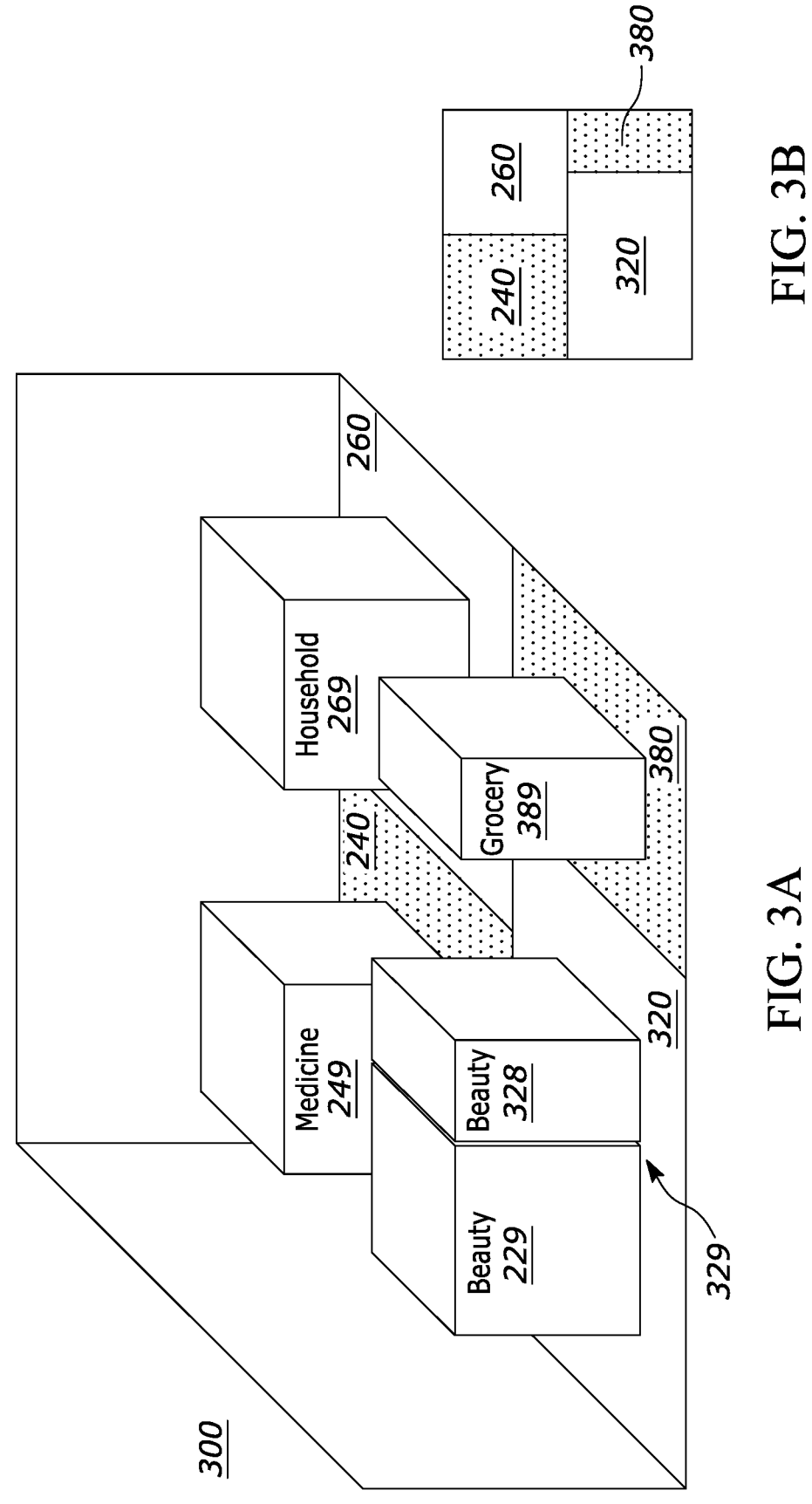
FIG. 3A depicts an exemplary retail environment after implementation of the techniques provided herein, according to one embodiment.
FIG. 3B depicts a plan view of the exemplary retail environment of FIG. 3A after implementation of the techniques provided herein, wherein space allotted to individual departments is shown, according to one embodiment.

FIG. 3A illustrates an exemplary retail environment 300 transformed after and optimized space outputs have been generated and implemented. As depicted, the beauty department 320 and the grocery department 380 have been allocated different amounts of space compared to the beauty department 220 and the grocery department 280 of FIG. 2A. In this example, the space optimizing application 126 may have calculated demand values of the beauty department 220, the medicine department 240, the household department 260, and the grocery department 260, determined a lift value indicating the demand values of the beauty department 220 and the grocery department 280 to be correlated, determined halo demand values for the beauty department 220 and the grocery department 280 to be different than the respective department's demand values, and generated an optimized space output based on the respective demand values and halo demand values. In contrast, in FIG. 3A the medicine department 240 and the household department 260 have been allocated the same amount of space in FIG. 3A as they occupied in FIG. 2A. In this example, the space optimizing application 126 may have determined a lift value indicating the demand value of the medicine department 240 to be uncorrelated with any other department, and the demand value of the household department 260 to be uncorrelated to any other department. Accordingly, the halo demand values of each department may be the same as the department's respective demand values. The space optimizing application 126 may then generate the optimized space outputs based on the demand values and halo demand values. In other examples, any combination of correlation between the four department's demand values may cause the illustrated optimized space output implementation of FIGS. 3A and 3B. FIG. 3A also illustrates how allocated department size transforms the available product space for each department. In this example, the beauty product space 329 may, cumulatively, be made up of the beauty product space 229 and a second beauty product space 328. Accordingly, the beauty product space 329 may be larger than the beauty product space 229. Additionally, the grocery product space 389 may be smaller than the grocery product space 289.

For both FIGS. 2A and 3A, the product space (e.g., 229, 249, 269, 288, 287) may not occupy all space allocated to the respective department to allow patrons to access products. When considering the systems and methods disclosed herein, the known size of the retail environment may be an amount of space that is available for retail products, excluding space required for visualizing the products. Accordingly, "department" and "product space" may be interchangeable. Product space may also be further segmented into sub-departments, as illustrated by the grocery product space 289 of a grocery department 280 divided into types of products, including pantry product space 288 (for products such as baking supplies, breakfast foods, or canned goods) and snack product space 287 (for products such as confections or other consumables). Accordingly, "sub-departments" and "product space" may be interchangeable. Furthermore, department space and product space sizes in FIGS. 2A and 2B and FIGS. 3A and 3B are exemplary for ease of illustration.
Example Method FIG. 4 depicts a flow diagram of an exemplary computer-implemented method 400 for space optimization in a retail environment, according to one embodiment. One or more steps of the method 400 may be implemented as a set of instructions stored on a computer-readable memory (e.g., memories 124, 156, 166) and executable on one or more processors (e.g., processors 122, 154, 164).

The method 400 may include calculating demand values associated with each of a plurality of departments that exist in a retail environment (BLOCK 402). For instance, departments in a retail environment may be treated independently to assess demand value of a department when in isolation, i.e., without the influence of other departments existing in the same retail environment. Demand value of a particular department may be assessed by fitting a demand curve to sales data of the department. In one embodiment, the curve may be given by:

$$d_i^s = 2A_i^c \left( \frac{1}{1 + e^{-B_i^c x_i^s}} - \frac{1}{2} \right)$$

where index i may refer to a particular department, c may refer to a cluster, $$x_i^s$$

may be the department size in the retail environment (i.e., store, s), and the parameters $$A_i^c \text{ and } B_i^c$$

may be fit to minimize a mean squared error between an actual demand value and a predicted demand value of the particular department in the retail environment.

A cluster may be defined within a retail environment based on various store and department level features, such as median income, store sales volume, or style of product assortments. For instance, in the retail environment 200 of FIG. 2A, consider the pantry product space 288 and a plurality of retail environments (e.g., storefronts) with spaces comparable to the pantry product space 288, similar retail environment-level features, and departments which share similar product assortment styles. The pantry product spaces from the plurality of retail environments, including the pantry product space 288, may be grouped together into a cluster because the retail environments share similar retail environment-level features, and the departments share similar assortment styles. The demand values for the pantry product spaces for all retail environments in the plurality of retail environments of this cluster may share the same parameters $$A_i^c \text{ and } B_i^c.$$

For retail environment (i.e., storefront) s, a unique pantry product demand value $$d_i^s$$

may be calculated using the respective pantry product space size, $$x_i^s.$$

Clustering retail environments together at a department level may help ensure that parameters are fit to datapoints that follow similar trends.

Calculating demand value $$d_i^s$$

based on actual and predicted demand values, a model may capture demand value as more than a single moment in time and instead as over a period of time. For example, the predicted demand value may be determined by fitting a first plurality of variable parameters to departmental data of department i captured over a first period of time from a first time to a second time. The predicted demand value may then represent the expected actual demand value of department i over a second period of time ranging from a third time to a fourth time, where the fourth time is subsequent to, or at least comes after, the second time of the first period of time. The predicted demand value may then be assessed by fitting a second plurality of variable parameters to the departmental data of department i captured over the second period of time, and thus determining the actual demand value. The actual demand and predicted demand values, $$A_i^s \text{ and } B_i^s,$$

may then be fit to minimize a mean squared error between the two. The parameters may regularly be calculated when new departmental data is known or when the demand model no longer accurately calculates a department's demand value.

Demand value of a particular department may be assessed by fitting a demand curve to sales data of the department and consider the total store sales volume. In certain embodiments, the curve may be given by:

$$d_i^s = 2\left(A_i^c + (k_i^c)^2 V_s\right)\left( \frac{1}{1 + e^{-B_i^c x_i^s}} - \frac{1}{2} \right)\left( \frac{1}{1 + e^{-Q_i^c h_i^s}} - \frac{1}{2} \right)$$

where index i may refer to a particular department, c may refer to a cluster, $$x_i^s$$

may be the department size in the retail environment (i.e., store, s), $V_s$ may be the total sales volume, $$h_i^s$$

65 may be the height of the department (e.g., department as shown in FIGS. 2A and 3A), and the parameters $$A_i^c, B_i^c, k_i^c, \text{ and } Q_i^c$$

may be fit to minimize a mean squared error between an actual demand value and a predicted demand value of the particular department in the retail environment. Furthermore, although index i may represent any department of a plurality of departments, demand value of a second department may be assessed by fitting a demand curve to sales data of the second department, the curve given by:

$$d_j^s = 2A_j^c\left(\frac{1}{1 + e^{-B_j^c x_j^s}} - \frac{1}{2}\right)$$

where index j may refer to the second department, c may refer to the clusters, $$x_j^s$$

may be the size of the second department in the retail environment (i.e., store, s), and the parameters $$A_j^c \text{ and } B_j^c$$

may be fit to minimize a mean squared error between an actual demand value and a predicted demand value of the second department. Using index i and index j may allow for a model to consider a relationship between a first and second department of a pair.

The method 400 may further include determining a halo demand value based on a relationship between a first demand value, associated with a first department of a pair, and an existence of a second department of the pair in the retail environment (BLOCK 404).

For example, a first and second department, indexed by i and j, respectively, of a plurality of departments, may be established as a pair to determine the influence (i.e., halo effect) the second department has on the first department's demand value by existing in the same store as the first department. In this instance, a first demand value of a first department adjusted for a halo effect the second department's existence has on the first demand value may be represented by a halo demand value, and modeled by the equation:

$$D_i^s = d_i^s\left(\beta_i + \alpha_{ij}d_j^s\right)$$

where $$D_i^s$$

may represent the halo demand value, and $\beta_i$ and $\alpha_{ij}$ may represent parameters that are fit to the departmental data. Specifically, $\alpha_{ij}$ may represent the halo effect that department j has on department i, and $\beta_i$ may represent a correction to the original fit. Furthermore, $$d_j^s$$

may represent the demand value of a second department in the cluster being considered. The equation used to determine a halo demand value may satisfy properties that are intrinsic to the method, including: 1) the halo effect the second department j has on the first department i may go to zero when the size of the second department j goes to zero, and 2) the calculated first demand value from department i goes to zero when the size of the first department i goes to zero.

In some examples, the method may further include determining a halo demand value for every possible ordered pair, whereby every department of the plurality of departments may be considered the first department of a pair while every other department being considered the second department of the pair, and every department of the plurality of departments may be considered the second department of a pair while every other department is considered the first department of the pair. In other words, the order of a pair should be considered when halo demand values are determined for every possible ordered pair.

This iterative process may result in a plurality of halo effects representing the cumulative influence exerted on the first demand value of the first department by the existence of every other department in the retail environment. Accordingly, a first halo demand value may consider the halo effect of a second department of a pair (when only a single pair is made from the plurality of departments) as well as a plurality of halo effects when the first department is paired with every other department of the plurality of departments. In other words, the plurality of halo effects may be cumulatively or individually considered when determining the first halo demand value or generating, calculating, or determining other relevant elements to the method.

The iterative process of determining a halo demand value for every ordered pair of departments is necessary because in some instances the halo effect $\alpha_{ij}$ may not be symmetric in i and j. In other words, $\alpha_{ij}$ may not equal $\alpha_{ji}$ as the influence the second department j has on the first demand value of first department i may not be the same as the influence the first department i has on the second demand value of the second department j. Although, in some instances, it may be possible for $\alpha_{ij}$ to equal $\alpha_{ji}$.

In embodiments, determining a halo demand value of BLOCK 404 may further include determining a lift value based on departmental data of the respective department. A lift value may represent the relationship between the pair of departments of which halo demand values are being determined. For example, lift, $L_{ij}$, may be modeled between departments i and j, by the equation:

$$L_{ij} = \frac{P(i \cap j)}{P(j)P(i)}$$

where, P(i) may be a first probability that a customer buys from department i, P(j) may be a second probability a customer buys from department j, and P(i∩j) may be a third probability a customer buys from both departments i and j. The first, second, and third probabilities may be included in departmental data. Furthermore, in some instances, $L_{ij}$ may be symmetric with $L_{ji}$.

If $L_{ij}$ is close to 1, the probabilities of buying from department i and j may be uncorrelated. In other words, departments i and j may not have a halo effect on each other. If $L_{ij}$ is either significantly above or below 1, the probabilities of buying from department i and j may be correlated and the departments i and j may either boost or cannibalize each other's sales, respectively.

It may, then, be pragmatic and discourage overfitting, for aspects of the method to only consider halo effects on a department i from department j, and/or vice versa, when the demand values of the two departments are significantly correlated. In some instances, this may be accomplished by a masking matrix, which may be represented by:

$$M_{ij} = \begin{cases} 1, & \text{otherwise} \\ 0, & \text{if } L_{ij} = 1 \end{cases}.$$

In some instances, a lift value significantly above or below 1 by adjustable parameters may determine whether demand values of two departments are significantly correlated. In these instances, the masking matrix may be represented by:

$$M_{ij} = \begin{cases} 0, & \text{if } (1-\epsilon) \le L_{ij} \le (1+\varepsilon) \\ 1, & \text{otherwsie} \end{cases}$$

where $\epsilon$ and $\varepsilon$ may be the adjustable parameters to establish an adjustable threshold for correlation. This masking matrix defines values between $(1-\epsilon)$ and $(1+\varepsilon)$ as the range of lift values, $L_{ij}$, in which halo effect may be disregarded. Therefore, the masking matrix may be represented by any model which reflects this concept.

In instances where, for example, computing capacity is limited, the possible combinations of departments is prohibitory to the methods herein, a more efficient method is desired, or overfitting should be appropriately discouraged, a masking matrix, among other pragmatic limitations, may allow a more efficient functioning of the methods. This may be accomplished by including a masking matrix, $M_{ij}$, when determining halo demand values. For example, the halo demand value where i is the first department of the pair may be further modeled by the equation:

$$D_i^s = d_i^s \left( \beta_i + M_{ij}\alpha_{ij}d_j^s \right)$$

where $L_{ij}$ being inside a threshold range (i.e., the first and second demand values of the first and second departments of the pair being uncorrelated) may cause $M_{ij}$ to be 0, the halo effect $\alpha_{ij}$ multiplied by 0 (thus no longer considered), and the first halo demand value $$D_i^s$$

to be the same as the first demand value. Conceptually, this may satisfy that a department's demand value, when uninfluenced by the existence of another department, remains unchanged. Accordingly, when $L_{ij}$ is outside a threshold range (i.e., the first and second demand values of the first second departments of the pair being correlated) may cause $M_{ij}$ to be 1, the halo effect $\alpha_{ij}$ multiplied by 1 (thus considered), and the halo demand value $$D_i^s$$

to be different from the first demand value.

As discussed, iterative combinations of department pairs may be made, each with a first department and a second department. To ensure all possible halo demand values have been determined before future steps, the method 400 may further include determining if a halo demand value has been determined for every possible ordered pair of departments, of the plurality of departments (BLOCK 406). If a halo demand value has not been determined for every possible ordered pair of departments, of the plurality of departments, the answer to BLOCK 406 may be "no" and the method may further follow the NO path. The NO path may return the method to begin BLOCK 404 with one of the departments of the pair being a department that has not been considered as either a first department or been considered as a second department with another department as first department or second department. If every department has been considered a first department of a pair with every department considered a second department of the pair, then a halo demand value may have been determined for every ordered pair of departments of the plurality of departments and the answer to BLOCK 406 may be "yes." Accordingly, the method may further follow the YES path.

After determining the halo demand values of a pair, BLOCK 406 may cause every iterative combination of departments to be considered. However, in some instances, not every department of the plurality of departments will be included in a pair, and thus, department pairs may only include pairs of departments being optimized. For example, a department may be excluded from the pairing process if the department's space allotment has been fixed. A department's size may be predetermined for various reasons, including: as required by contractual agreements such as those between a product manufacturer and a product retailer, a store manager's preference, architectural requirements of a space, or when needing to gather unknown departmental data by establishing a new department. This may also be accomplished by removing the fixed size of the predetermined space from the known size of the retail environment beginning in BLOCK 402.

After following the YES path, the method 400 may further include generating an optimized space output corresponding to a proportion of the retail environment allotted to each department based on respective demand values for each department and halo demand values associated with each possible ordered pair of departments of the plurality of departments. (BLOCK 408).

In some embodiments, generation of an optimized space output may consider previously determined values, such as demand values and halo demand values, to select department sizes that maximize the total estimated halo demand values of the plurality of departments (i.e., the sum of $$D_i^s$$

Optimization may, for example, include standard mixed-integer linear programming techniques to identify potential trade-offs between conflicting space outputs and maximize the total potential demand of a retail environment.

In embodiments, generation of an optimized space output may further include pragmatic limitations and/or transformations of previously determined values to generate meaningful and/or actionable optimized space outputs comprehendible by managers of the retail environment.

For example, the halo demand value of each department in the plurality of departments may be further transformed to represent the cumulative influence exerted on a demand value of a department by the existence of every other department in the retail environment. This cumulative halo demand value may be given by the equation:

$$\mathcal{D}_i^s = d_i^s\left(\beta_i + \sum_j M_{ij}\alpha_{ij}d_j^s\right)$$

where i may represent a department and j may be indexed for every other department in the retail environment. For example, department i may be considered a first department of a pair with every other department considered as a second department. Furthermore, i may be indexed so the cumulative influence of every department on every other department is determined.

In embodiments, generation of an optimized space output may further include measuring and adjusting the complexity of the cumulative halo demand value models. For example, when fitting parameters, an L2 regularization term, r, may be used to improve the fit in the presence of limited or noisy data (e.g., departmental data, demand values). The regularization term, r, may be modeled by the equation:

$$r = \lambda\left(\sum_{ij}\alpha_{ij}^2 + \sum_i(1-\beta_i)^2\right)$$

where $\lambda$ may be an adjustable parameter. When the $\alpha$ and $\beta$ terms are fit by minimizing the sum or r and the mean squared error between the actual demand value and predicted demand value, $\lambda$ may cause the $\alpha_{ij}$ terms to tend toward zero and the $\beta_i$ terms to tend towards 1 (i.e., tending toward no halo effect). Accordingly, in instances, a larger $\lambda$ may cause the model to be more cautious about estimating a large halo effect.

In embodiments, generation of an optimized space output may further include limiting the cumulative halo effect exerted by the plurality of departments on an individual department. In theory, every department, of the plurality of departments, may influence the demand value of an individual department simultaneously. When, for example, hundreds or more of departments are in the retail environment, the cumulative halo demand value may be unrealistic or manageable. Limiting the cumulative halo demand value may be achieved by, for example, including adjustable parameters and/or adding non-linearity to the equation modeling the cumulative halo demand value. For example, the equations:

$$H_i^S = \beta_i - 1 + \left(\sum_j M_{ij}\alpha_{ij}d_j^S\right)$$

and $$\mathcal{D}_i^{\prime s} = d_i^s\left(1 - K + \frac{2K}{1+e^{-\frac{2}{K}H_i^S}}\right)$$

24 may model a non-linear cumulative halo demand value, $$\mathcal{D}_i^{\prime s}, \text{ where } H_i^s$$

may represent a cumulative halo demand value and K may be an adjustable parameter to control non-linearity. The equations may satisfy the property that as K→∞, non-linearity may dissipate and $$\mathcal{D}_i^{\prime s} \text{ may approach } \mathcal{D}_i^s.$$

In other words, small values of K may squash halo effect $\alpha_{ij}$, flattening it out beyond a certain limit.

In some examples, the method 400 may further include applying an optimizing model to the demand values for each of the plurality of departments and the respective halo demand values for each possible ordered pair of departments to generate an optimized space output. Furthermore, the optimizing model may be a machine learning (ML) model trained on historical departmental data indicative of a plurality of departmental data of a plurality of retail environments and a plurality of respectively generated historical optimized space outputs to generate the optimized space output based on new departmental data.

For example, the space optimizing ML model 128b trained on historical examples of the method 400 being implemented in a retail environment, and subsequent historical departmental data from the same retail environment indicative of the success and/or accuracy of the method 400, may be able to generate an optimized space output. The space optimizing ML model 128b may be trained by an ML model training application 128a.

Additionally, or alternatively, an ML model may also be applied at other steps of the method 400. For example, an ML model may be trained on historical demand values and departmental data to output demand values, halo demand values, and/or halo demand values transformed by pragmatic limitations when given new department data as input.

Example Computing System

Figure 5:
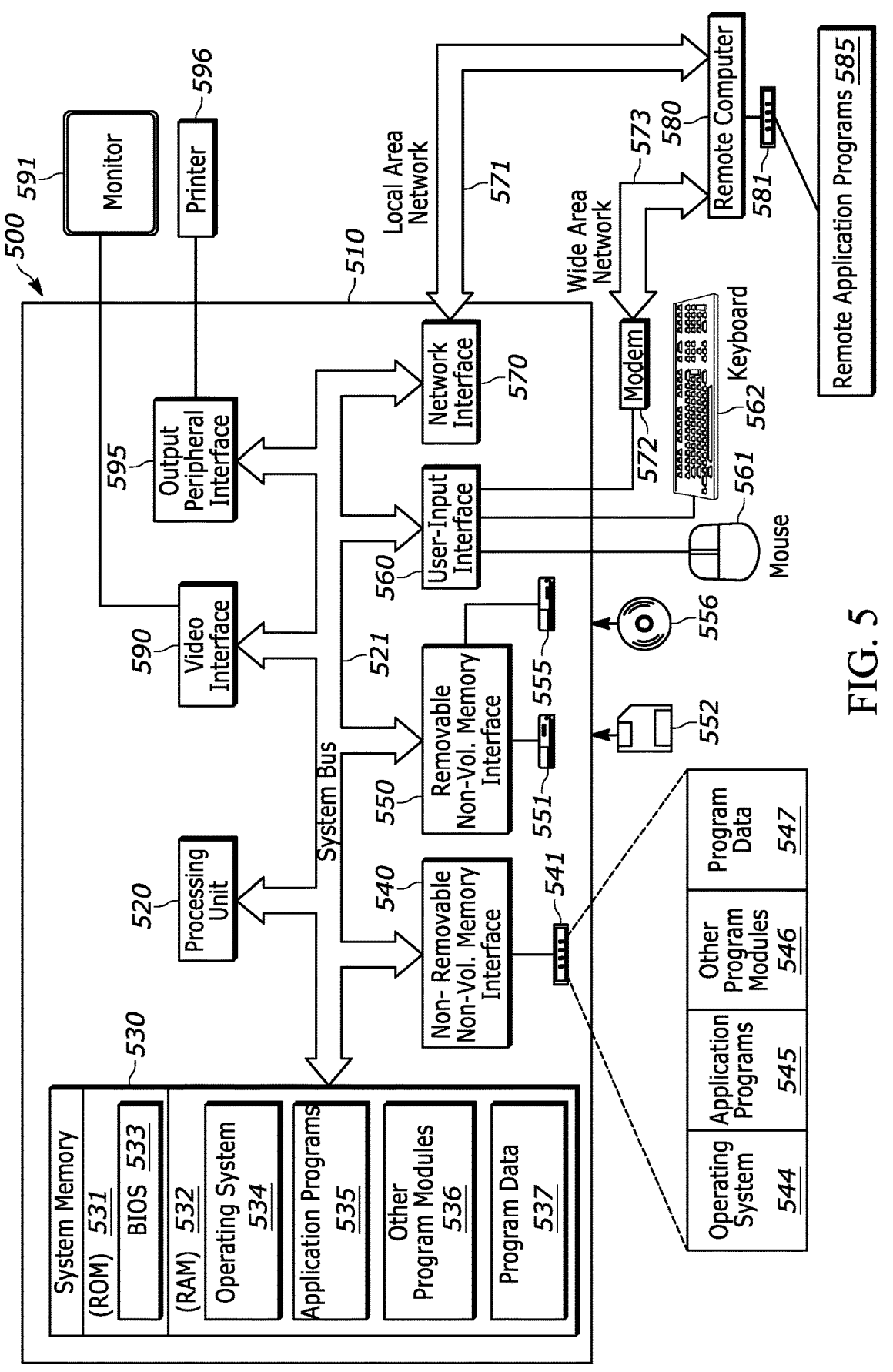
FIG. 5 depicts an exemplary computing system in which the techniques described herein may be implemented, according to one embodiment.

FIG. 5 depicts an exemplary computing system 120 in which the techniques described herein may be implemented, according to one embodiment. The computing system 120 of FIG. 5 may include a computing device in the form of a computer 510. Components of the computer 510 may include, but are not limited to, a processing unit 520 (e.g., corresponding to the processor(s) 122 of FIG. 1), a system memory 530 (e.g., corresponding to the memorie(s) 124 of FIG. 1), and a system bus 521 that couples various system components including the system memory 530 to the processing unit 520. The system bus 521 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 510 may include a variety of computer-readable media. Computer-readable media may be any available media that can be accessed by computer 510 and may include both volatile and nonvolatile media, and both removable and non-removable media. By way of example, and not limitation, computer-readable media may comprise computer storage media and communication media.

Computer storage media may include volatile and non-volatile, removable and non-removable media implemented in any method or technology for storage of information such as computer-readable instructions, data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510.

Communication media typically embodies computer-readable instructions, data structures, program modules or other data in a modulated data signal such as a carrier wave or other transport mechanism, and may include any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared and other wireless media. Combinations of any of the above are also included within the scope of computer-readable media.

The system memory 530 may include computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to, and/or presently being operated on, by processing unit 520. By way of example, and not limitation, FIG. 5 illustrates operating system 534, application programs 535 (e.g., corresponding to the space optimizing application 126 of FIG. 1), other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 may be connected to the system bus 521 through a non-removable memory interface such as interface 540, and magnetic disk drive 551 and optical disk drive 555 may be connected to the system bus 521 by a removable memory interface, such as interface 550.

The drives and their associated computer storage media discussed above and illustrated in FIG. 5 provide storage of computer-readable instructions, data structures, program modules and other data for the computer 510. In FIG. 5, for example, hard disk drive 541 is illustrated as storing operating system 544, application programs 545, other program modules 546, and program data 547. Note that these components may either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as cursor control device 561 (e.g., a mouse, trackball, touch pad, etc.) and keyboard 562. A monitor 591 or other type of display device is also connected to the system bus 521 via an interface, such as a video interface 590. In addition to the monitor, computers may also include other peripheral output devices such as printer 596, which may be connected through an output peripheral interface 595.

The computer 510 may operate in a networked environment using logical connections to one or more remote computers, such as a remote computer 580. The remote computer 580 may be a mobile computing device, personal computer, a server, a router, a network PC, a peer device or other common network node, and may include many or all of the elements described above relative to the computer 510, although only a memory storage device 581 has been illustrated in FIG. 5. The logical connections depicted in FIG. 5 include a local area network (LAN) 571 and a wide area network (WAN) 573 (e.g., either or both of which may correspond to the network 140 of FIG. 1), but may also include other networks. Such networking environments are commonplace in hospitals, offices, enterprise-wide computer networks, intranets and the Internet.

When used in a LAN networking environment, the computer 510 is connected to the LAN 571 through a network interface or adapter 570. When used in a WAN networking environment, the computer 510 may include a modem 572 or other means for establishing communications over the WAN 573, such as the Internet. The modem 572, which may be internal or external, may be connected to the system bus 521 via the input interface 360, or other appropriate mechanism. The communications connections 570, 572, which allow the device to communicate with other devices, are an example of communication media, as discussed above. In a networked environment, program modules depicted relative to the computer 510, or portions thereof, may be stored in the remote memory storage device 581. By way of example, and not limitation, FIG. 5 illustrates remote application programs 585 as residing on memory device 581.

The techniques for space optimization of a retail environment described above may be implemented in part or in their entirety within a computing system such as the computing system 120 illustrated in FIG. 5. In some such embodiments, the LAN 571 or the WAN 573 may be omitted. Application programs 535 and 545 may include a software application (e.g., a web-browser application) that is included in a user interface, for example.

ADDITIONAL CONSIDERATIONS

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" or "some embodiments" means that a particular element, feature, structure, or characteristic described in connection with the embodiment is included in at least one embodiment. The appearances of the phrase "in one embodiment" or "in some embodiments" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for space optimization in a retail environment. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for space optimization in a virtual retail environment, comprising:

calculating, by one or more processors, demand values associated with each of a plurality of departments that exist in the virtual retail environment based on departmental data associated with each of the plurality of departments, the virtual retail environment having a known amount of space; for each possible ordered pair of departments, of the plurality of departments, determining, by the one or more processors, a halo demand value based on a relationship between a first demand value, associated with a first department of a pair, and an existence of a second department of the pair in the virtual retail environment;

generating, by the one or more processors, an optimized space output corresponding to a proportion of the virtual retail environment allotted to each of the plurality of departments based on respective demand values for each of the plurality of departments and halo demand values associated with each possible ordered pair of departments of the plurality of departments;

receiving, by the one or more processors, at least one of: (i) a memory capacity of a user device, (ii) a processor capacity of the user device, or (iii) a screen size of the user device;

configuring, by the one or more processors, sizes of one or more departments of the plurality of departments that exist in the virtual retail environment for display on the user device based on the optimized space output corresponding to the proportion of the virtual retail environment allotted to each of the plurality of departments, and the at least one of: (i) the memory capacity of the user device, (ii) the processor capacity of the user device, or (iii) the screen size of the user device one or more of: (i) a memory capacity, (ii) a processor capacity, or (iii) a screen size of the user device; and causing, by the one or more processors, the configured virtual retail environment to be displayed on the user device.

2. The computer-implemented method of claim 1, further comprising for each possible ordered pair of departments:

determining, by the one or more processors, a lift value based on the departmental data of the first department and the second department; and determining, by the one or more processors, whether the halo demand value is different from the first demand value by comparing the lift value to a threshold range of values.

3. The computer-implemented method of claim 2, wherein determining the lift value includes:

determining, by the one or more processors, a first probability a customer buys from the first department based on departmental data of the first department;

determining, by the one or more processors, a second probability a customer buys from the second department based on departmental data of the second department;

determining, by the one or more processors, a third probability a customer buys from the first department and the second department based on departmental data of the first department and the second department; and determining, by the one or more processors, the lift value based on the first probability, the second probability, and the third probability.

4. The computer-implemented method of claim 1, wherein the departmental data includes one or more of (i) a size of the virtual retail environment, (ii) a size of each department of the plurality of departments, (iii) sales data of the first department and the second department, or (iv) customer behavior data.

5. The computer-implemented method of claim 1, wherein calculating demand values for each department further include:

determining, by the one or more processors, a predicted demand value by fitting a first plurality of variable parameters to the departmental data of the department captured over a first period of time from a first time to a second time; and determining, by the one or more processors, an actual demand value by fitting a second plurality of variable parameters to the departmental data of the department captured over a second period of time from a third time to a fourth time, wherein the fourth time is subsequent to the second time.

6. The computer-implemented method of claim 1, wherein the optimized space output is further based on a cumulative halo demand value, and wherein generating the optimized space output further includes:

determining, by the one or more processors, the cumulative halo demand value based on the halo demand values associated with each possible ordered pair of departments of the plurality of departments; and limiting, by the one or more processors, the cumulative halo demand value based on a plurality of adjustable parameters.

7. The computer-implemented method of claim 1, wherein generating an optimized space output further includes:

applying, by the one or more processors, an optimizing model to the demand values for each of the plurality of departments and the halo demand values associated with each possible ordered pair of departments to generate the optimized space output, the optimizing model being a machine learning model trained on historical departmental data indicative of a plurality of departmental data of a plurality of retail environments and a plurality of respectively generated historical optimized space outputs to generate the optimized space output based on new departmental data.

8. A computer system comprising one or more processors, and one or more non-transitory memories storing computer-readable instructions for space optimization in a virtual retail environment, that, when executed by one or more processors, cause the one or more processors to:

calculate demand values associated with each of a plurality of departments that exist in the virtual retail environment based on departmental data associated with each of the plurality of departments, the virtual retail environment having a known amount of space;

for each possible ordered pair of departments, of the plurality of departments, determine, by the one or more processors, a halo demand value based on a relationship between a first demand value, associated with a first department of a pair, and an existence of a second department of the pair in the virtual retail environment;

generate, by the one or more processors, an optimized space output corresponding to a proportion of the virtual retail environment allotted to each of the plurality of departments based on respective demand values for each of the plurality of departments and halo demand values associated with each possible ordered pair of departments of the plurality of departments;

receive at least one of: (i) a memory capacity of a user device, (ii) a processor capacity of the user device, or (iii) a screen size of the user device;

configure sizes of one or more departments of the plurality of departments that exist in the virtual retail environment for display on the user device based on the optimized space output corresponding to the proportion of the virtual retail environment allotted to each of the plurality of departments, and the at least one of: (i) the memory capacity of the user device, (ii) the processor capacity of the user device, or (iii) the screen size of the user device one or more of: (i) a memory capacity, (ii) a processor capacity, or (iii) a screen size of the user device; and cause the configured virtual retail environment to be displayed on the user device.

9. The computer system of claim 8, wherein the computer-readable instructions, when executed by the one or more processors, further cause the one or more processors to, for each possible ordered pair of departments:

determine, by the one or more processors, a lift value based on the departmental data of the first department and the second department; and determine, by the one or more processors, whether the halo demand value is different from the first demand value by comparing the lift value to a threshold range of values.

10. The computer system of claim 9, wherein the computer-readable instructions for determining the lift value further include instructions that, when executed by the one or more processors, cause the one or more processors to:

determine, by the one or more processors, a first probability a customer buys from the first department based on departmental data of the first department;

determine, by the one or more processors, a second probability a customer buys from the second department based on departmental data of the second department;

determine, by the one or more processors, a third probability a customer buys from the first department and the second department based on departmental data of the first department and the second department; and determine, by the one or more processors, the lift value based on the first probability, the second probability, and the third probability.

11. The computer system of claim 8, wherein the departmental data includes one or more of (i) a size of the virtual retail environment, (ii) a size of each department of the plurality of departments, (iii) sales data of the first department and the second department, or (iv) customer behavior data.

12. The computer system of claim 8, wherein the computer-readable instructions for determining demand values further include instructions that, when executed by the one or more processors, cause the one or more processors to:

determining, by the one or more processors, determine a predicted demand value by fitting a first plurality of variable parameters to the departmental data of the department captured over a first period of time from a first time to a second time; and determining, by the one or more processors, determine an actual demand value by fitting a second plurality of variable parameters to the departmental data of the department captured over a second period of time from a third time to a fourth time, wherein the fourth time is subsequent to the second time.

13. The computer system of claim 8, wherein the computer-readable instructions for generating the optimized space output is further based on a cumulative halo demand value, and wherein the computer-readable instructions for generating the optimized space output further includes instructions that, when executed by the one or more processors, cause the one or more processors to:

determining, by the one or more processors, determine the cumulative halo demand value based on the halo demand values associated with each possible ordered pair of departments of the plurality of departments; and limiting, by the one or more processors, limit the cumulative halo demand value based on a plurality of adjustable parameters.

14. A non-transitory computer-readable medium storing instructions for space optimization in a virtual retail environment, that, when executed by one or more processors, cause the one or more processors to:

calculate, by one or more processors, demand values associated with each of a plurality of departments that exist in the virtual retail environment based on departmental data associated with each of the plurality of departments, the virtual retail environment having a known amount of space; for each possible ordered pair of departments, of the plurality of departments, determine, by the one or more processors, a halo demand value based on a relationship between a first demand value, associated with a first department of a pair, and an existence of a second department of the pair in the virtual retail environment;

generate, by the one or more processors, an optimized space output corresponding to a proportion of the virtual retail environment allotted to each of the plurality of departments based on respective demand values for each of the plurality of departments and halo demand values associated with each possible ordered pair of departments of the plurality of departments;

receive at least one of: (i) a memory capacity of a user device, (ii) a processor capacity of the user device, or (iii) a screen size of the user device;

configure sizes of one or more departments of the plurality of departments that exist in the virtual retail environment for display on the user device based on the optimized space output corresponding to the proportion of the virtual retail environment allotted to each of the plurality of departments, and the at least one of: (i) the memory capacity of the user device, (ii) the processor capacity of the user device, or (iii) the screen size of the user device one or more of: (i) a memory capacity, (ii) a processor capacity, or (iii) a screen size of the user device; and cause the configured virtual retail environment to be displayed on the user device.

15. The non-transitory computer-readable medium of claim 14, wherein for each possible ordered pair of departments the instructions further include:

determine, by the one or more processors, a lift value based on the departmental data of the first department and the second department; and determine, by the one or more processors, whether the halo demand value is different from the first demand value by comparing the lift value to a threshold range of values.

16. The non-transitory computer-readable medium of claim 15, wherein the instructions for determining the lift value further include instructions that, when executed by the one or more processors, cause the one or more processors to:

determining, by the one or more processors, determine a first probability a customer buys from the first department based on departmental data of the first department;

determining, by the one or more processors, determine a second probability a customer buys from the second department based on departmental data of the second department;

determining, by the one or more processors, determine a third probability a customer buys from the first department and the second department based on departmental data of the first department and the second department; and determining, by the one or more processors, determine the lift value based on the first probability, the second probability, and the third probability.

17. The non-transitory computer-readable medium of claim 14, wherein the departmental data includes one or more of (i) a size of the virtual retail environment, (ii) a size of each department of the plurality of departments, (iii) sales data of the first department and the second department, or (iv) customer behavior data.

18. The non-transitory computer-readable medium of claim 14, wherein the instructions for determining demand values for each department further include instructions that, when executed by the one or more processors, cause the one or more processors to:

determining, by the one or more processors, determine a predicted demand value by fitting a first plurality of variable parameters to the departmental data of the department captured over a first period of time from a first time to a second time; and determining, by the one or more processors, determine an actual demand value by fitting a second plurality of variable parameters to the departmental data of the department captured over a second period of time from a third time to a fourth time, wherein the fourth time is subsequent to the second time.

19. The non-transitory computer-readable medium of claim 14, wherein the instructions for determining the optimized space output is further based on a cumulative halo demand value, and wherein the instructions for generating the optimized space output further includes include instructions that, when executed by the one or more processors, cause the one or more processors to:

determining, by the one or more processors, determine the cumulative halo demand value based on the halo demand values associated with each possible ordered pair of departments of the plurality of departments; and limiting, by the one or more processors, limit the cumulative halo demand value based on a plurality of adjustable parameters.

* * * * *